United States Patent
Chen et al.

(10) Patent No.: US 11,531,239 B2
(45) Date of Patent: Dec. 20, 2022

(54) ELECTRONIC DEVICE COMPRISING A PATTERNED ELECTRODE HAVING AT LEAST ONE SUB-PORTION WITH A FIRST INCLUDED ANGLE BETWEEN ONE OF A PLURALITY OF BRANCH PORTIONS AND A FIRST ABSORPTION AXIS

(71) Applicant: InnoLux Corporation, Miao-Li County (TW)

(72) Inventors: Yi-Hsin Chen, Miao-Li County (TW); Ying-Jen Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/474,339

(22) Filed: Sep. 14, 2021

(65) Prior Publication Data
US 2022/0121063 A1   Apr. 21, 2022

(30) Foreign Application Priority Data
Oct. 16, 2020 (CN) .......................... 202011110700.8

(51) Int. Cl.
*G02F 1/1343* (2006.01)
*G02F 1/1335* (2006.01)
*G02F 1/13357* (2006.01)

(52) U.S. Cl.
CPC .. *G02F 1/134318* (2021.01); *G02F 1/133531* (2021.01); *G02F 1/133602* (2013.01)

(58) Field of Classification Search
CPC ......... G02F 1/133531; G02F 1/133602; G02F 1/134318; G02F 1/1676; G02F 2201/12; G02F 2201/124
See application file for complete search history.

(56) References Cited

U.S. PATENT DOCUMENTS

2015/0015829 A1* 1/2015 Chen ................. G02F 1/133707
                                                              349/96
2017/0357130 A1* 12/2017 Son ........................ G02F 1/1341

FOREIGN PATENT DOCUMENTS

CN         103091912 A   *  5/2013    ......... G02F 1/13439
JP       2001343666 A   * 12/2001    ....... G02F 1/134309

* cited by examiner

*Primary Examiner* — Paul C Lee
(74) *Attorney, Agent, or Firm* — McClure, Qualey & Rodack, LLP

(57) ABSTRACT

An electronic device includes a panel including a first substrate, a second substrate, a liquid-crystal layer including a left-handed chiral dopant, a first polarizing plate, a second polarizing plate and a patterned electrode. The first polarizing plate has a first absorption axis perpendicular to a second absorption axis of the second polarizing plate. The patterned electrode has a sub-portion that includes a plurality of branch portions. A first included angle is between one of the branch portions and the first absorption axis. A second included angle is between one of the branch portions and the second absorption axis. While the patterned electrode is disposed between the first substrate and the liquid-crystal layer, the first included angle is greater than the second included angle. While the patterned electrode is disposed between the second substrate and the liquid-crystal layer, the first included angle is smaller than the second included angle.

15 Claims, 10 Drawing Sheets

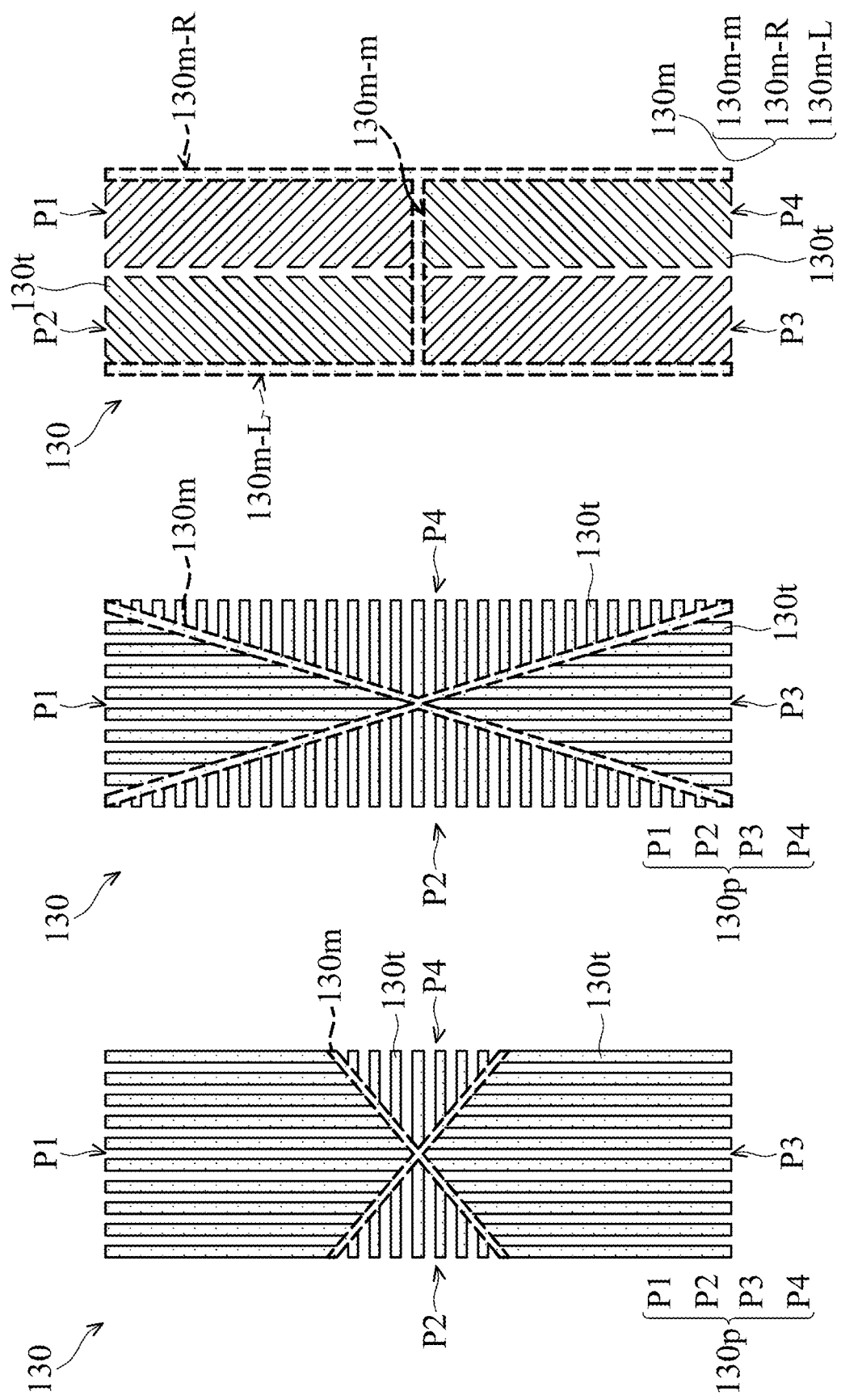

ELECTRONIC DEVICE COMPRISING A PATTERNED ELECTRODE HAVING AT LEAST ONE SUB-PORTION WITH A FIRST INCLUDED ANGLE BETWEEN ONE OF A PLURALITY OF BRANCH PORTIONS AND A FIRST ABSORPTION AXIS

CROSS REFERENCE TO RELATED APPLICATIONS

This application claims the benefit of China Application No. 202011110700.8, filed Oct. 16, 2020, the entirety of which is incorporated by reference herein.

BACKGROUND

Technical Field

The present disclosure is related to an electronic device, and in particular it is related to a patterned electrode design for an electronic device.

Description of the Related Art

Electronic devices, such as smartphones, tablet computers, notebook computers, displays, and televisions etc., have become indispensable necessities in modern society. However, existing electronic devices (e.g., display devices) have not been entirely satisfactory in all aspects. For example, dark bands are easily formed in the main portion of the patterned electrode. When the resolution increases or the pixel size decreases, the ratio of the dark-band area to the overall pixel area increases, which affects display efficiency and quality. Therefore, the development of a structural design that can further improve the quality or performance of electronic devices is still currently an important research topic in the industry.

SUMMARY

In accordance with some embodiments of the present disclosure, an electronic device is provided. The electronic device includes a backlight source and a panel. The panel is disposed on the backlight source, and the panel includes a first substrate, a second substrate, a liquid-crystal layer, a first polarizing plate, a second polarizing plate and a patterned electrode. The first substrate is adjacent to the backlight source. The second substrate is opposite to the first substrate. The liquid-crystal layer is disposed between the first substrate and the second substrate, and the liquid-crystal layer includes a left-handed chiral dopant. The first polarizing plate has a first absorption axis, the second polarizing plate has a second absorption axis, and the first absorption axis is perpendicular to the second absorption axis. The patterned electrode is disposed between the first substrate and the liquid-crystal layer or between the second substrate and the liquid-crystal layer. The patterned electrode has at least one sub-portion, and the at least one sub-portion includes a plurality of branch portions. There is a first included angle between one of the plurality of branch portions and the first absorption axis. There is a second included angle between one of the plurality of branch portions and the second absorption axis. While the patterned electrode is disposed between the first substrate and the liquid-crystal layer, the first included angle is greater than the second included angle. While the patterned electrode is disposed between the second substrate and the liquid-crystal layer, the first included angle is smaller than the second included angle.

In accordance with some other embodiments of the present disclosure, an electronic device is provided. The electronic device includes a backlight source and a panel. The panel is disposed on the backlight source, and the panel includes a first substrate, a second substrate, a liquid-crystal layer, a first polarizing plate, a second polarizing plate and a patterned electrode. The first substrate is adjacent to the backlight source. The second substrate is opposite to the first substrate. The liquid-crystal layer is disposed between the first substrate and the second substrate, and the liquid-crystal layer includes a right-handed chiral dopant. The first polarizing plate has a first absorption axis, the second polarizing plate has a second absorption axis, and the first absorption axis is perpendicular to the second absorption axis. The patterned electrode is disposed between the first substrate and the liquid-crystal layer or between the second substrate and the liquid-crystal layer. The patterned electrode has at least one sub-portion, and the at least one sub-portion includes a plurality of branch portions. There is a first included angle between one of the plurality of branch portions and the first absorption axis. There is a second included angle between one of the plurality of branch portions and the second absorption axis. While the patterned electrode is disposed between the first substrate and the liquid-crystal layer, the first included angle is smaller than the second included angle. While the patterned electrode is disposed between the second substrate and the liquid-crystal layer, the first included angle is greater than the second included angle.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein:

FIG. 9 is a top-view diagram of the patterned electrode of an electronic device in accordance with some embodiments of the present disclosure;

FIG. 10 is a top-view diagram of the patterned electrode of an electronic device in accordance with some embodiments of the present disclosure;

FIG. 11 is a top-view diagram of the patterned electrode of an electronic device in accordance with some embodiments of the present disclosure;

DETAILED DESCRIPTION

Figure 1B:
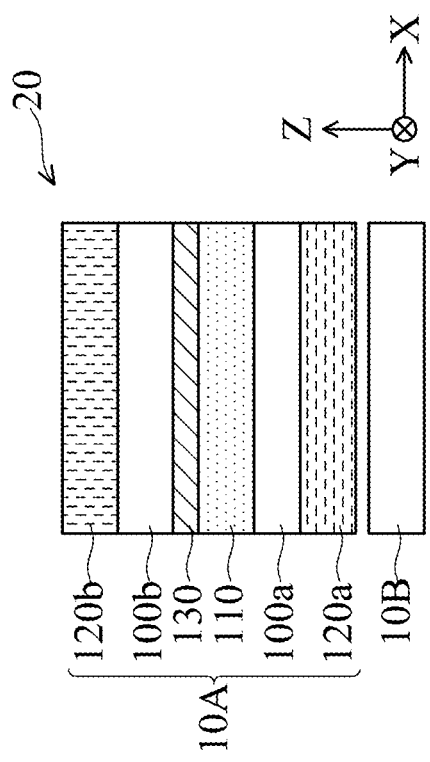
FIGS. 1A to 1D are cross-sectional diagrams of an electronic device in accordance with some embodiments of the present disclosure.

The electronic device of the present disclosure is described in detail in the following description. It should be understood that in the following detailed description, for purposes of explanation, numerous specific details and embodiments are set forth in order to provide a thorough understanding of the present disclosure. The elements and configurations described in the following detailed description are set forth in order to clearly describe the present disclosure. These embodiments are used merely for the purpose of illustration, and the present disclosure is not limited thereto. In addition, different embodiments may use like and/or corresponding numerals to denote like and/or corresponding elements in order to clearly describe the present disclosure. However, the use of like and/or corresponding numerals of different embodiments does not suggest any correlation between different embodiments.

The present disclosure can be understood by referring to the following detailed description in connection with the accompanying drawings. It should be noted that in order to make it easy for readers to understand and concise the drawings, only a part of the electronic device is drawn in some of the drawings of the present disclosure, and specific elements in the drawings may be not drawn to scale. In addition, the number and size of the element in the drawings are only for illustration, and are not intended to limit the scope of the present disclosure.

It should be understood that some of the elements or devices in the drawings of the present disclosure may be present in the form or configuration known to those skilled in the art. In addition, in the embodiments, relative expressions may be used. For example, "lower", "bottom", "higher" or "top" are used to describe the position of one element relative to another. It should be appreciated that if a device is flipped upside down, an element that is "lower" will become an element that is "higher". The present disclosure can be understood by referring to the following detailed description in connection with the accompanying drawings. The drawings are also regarded as part of the description of the present disclosure. Moreover, the expressions such as "first material layer disposed on/over a second material layer", may indicate the direct contact of the first material layer and the second material layer, or it may indicate an indirect contact state with one or more intermediate layers between the first material layer and the second material layer. In the above situation, the first material layer may not be in direct contact with the second material layer.

Throughout the present disclosure and the appended claims, certain terms are used to refer to specific elements. Those skilled in the art should understand that electronic device manufacturers may refer to the same element with different names. The present disclosure does not intend to distinguish between elements that have the same function but different names. In the specification and claims, the terms "comprising", "including", "having" and the like are open-ended phrases, so they should be interpreted as "including but is not limited to . . . ". Therefore, when the terms "comprising", "including" and/or "having" are used in the description of the present disclosure, they specify the corresponding features, regions, steps, operations and/or components, but do not exclude the existence of one or more corresponding features, regions, steps, operations and/or components.

Directional terms mentioned in the present disclosure, such as "upper", "lower", "front", "rear", "left", "right", etc., are only the directions referring to the drawings. Therefore, the directional terms are used for illustration, not for limiting the present disclosure. In the drawings, each drawing depicts general features of methods, structures, and/or materials used in particular embodiments. However, these drawings should not be interpreted as defining or limiting the scope or properties encompassed by these embodiments. For example, for clarity, the relative sizes, thicknesses, and positions of the various layers, regions, and/or structures may be reduced or enlarged.

When a corresponding component (such as a layer or region) is referred to as "(disposed or located) on another component", it may be directly (disposed or located) on another component, or there may be other components between them. On the other hand, when a component is referred to as "directly (disposed or located) on another component", there is no component existing between them. In addition, when a component is referred to as "(disposed or located) on another component", the two have an upper-lower relationship from a top view, and this component may be above or below another component, and the upper-lower relationship depends on the orientation of the device.

Furthermore, it should be understood that, although the terms "first", "second", "third" etc. may be used herein to describe various elements, components, regions, layers, or portions, these elements, components, regions, layers, or portions should not be limited by these terms. These terms are only used to distinguish one element, component, region, layer, or portion from another element, component, region, layer, or portion. Thus, a first element, component, region, layer, or portion discussed below could be termed a second element, component, region, layer, or portion without departing from the teachings of the present disclosure.

In the context, the terms "about" and "substantially" typically mean+/−10% of the stated value, or typically +/−5% of the stated value, or typically +/−3% of the stated value, or typically +/−2% of the stated value, or typically +/−1% of the stated value or typically +/−0.5% of the stated value. The stated value of the present disclosure is an approximate value. When there is no specific description, the stated value includes the meaning of "about" or "substantially". In addition, the term "in a range from the first value to the second value" means that the range includes the first value, the second value, and other values in between.

It should be understood that in the following embodiments, without departing from the spirit of the disclosure, the features in several different embodiments can be replaced, recombined, and mixed to complete another embodiment. The features between the various embodiments can be mixed and matched arbitrarily as long as they do not violate or conflict the spirit of the present disclosure.

In accordance with the embodiments of the present disclosure, the thickness, length and width of an element can be measured using an optical microscope, and the thickness of the element can be measured from a cross-sectional image obtained using an electron microscope, but it is not limited thereto. In addition, certain errors may exist between any two values or directions used for comparison. If the first value is equal to the second value, it may imply that there may be an 10% error between the first value and the second value; if the first direction is perpendicular to the second direction, the angle between the first direction and the second direction may be between 80 degrees and 100 degrees; and if the first direction is parallel to the second direction, the angle between the first direction and the second direction may be between 0 degrees and 10 degrees.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with some embodiments of the present disclosure, an electronic device is provided. By adding a chiral dopant to the liquid-crystal layer and adjusting the included angle between the absorption axis of the polarizing plate and the patterned electrode, the light transmittance of the electronic device can be increased. In accordance with some embodiments of the present disclosure, the patterned electrode can be designed so that the problem of dark bands occurring in the edge area of the patterned electrode because the optical rotation of liquid crystals can be reduced.

In accordance with some embodiments of the present disclosure, the electronic device may include a display device, a light-emitting device, a touch device, a sensing device, a tiled device, or a combination thereof, but it is not limited thereto. The electronic device may include a bendable or flexible electronic device. The electronic device may include, for example, a liquid-crystal device, but it is not limited thereto. In accordance with some embodiments, the electronic device may include a backlight module. In the following context, a display device will be used as an example to describe the electronic device, but the present disclosure is not limited thereto.

Figure 1D:
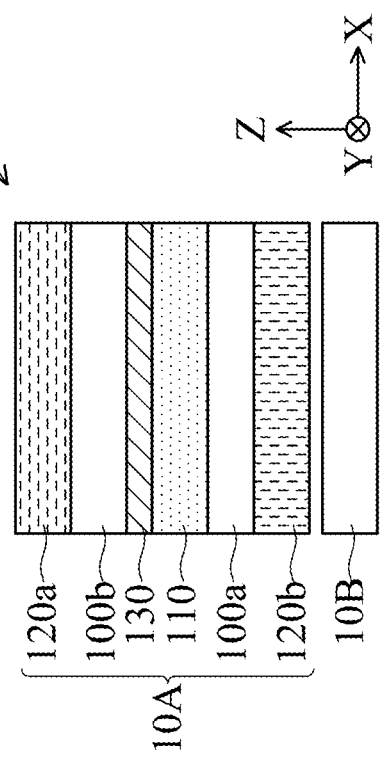
Figure 1A:
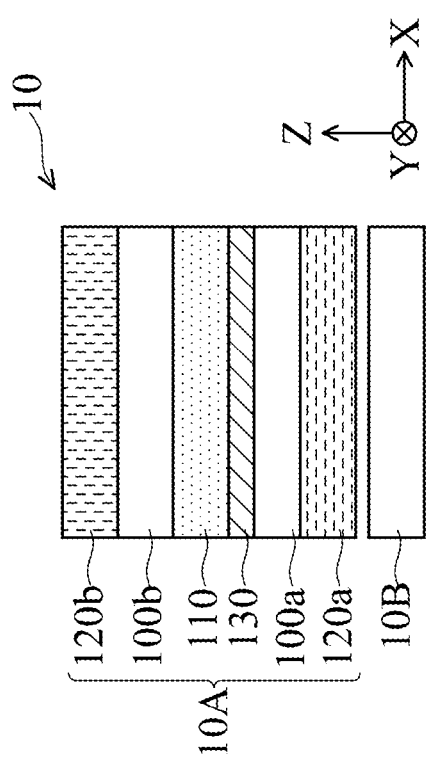

Refer to FIG. 1A, which is a cross-sectional diagram of an electronic device 10 in accordance with some embodiments of the present disclosure. It should be understood that, for clear description, some elements of the electronic device 10 are omitted in the drawing, and only some of the elements are schematically shown. In accordance with some embodiments, additional features may be added to the electronic device 10 described below. In accordance with some other embodiments, some of the elements or layers of the electronic device 10 described below may be replaced or omitted according to needs.

As shown in FIG. 1A, the electronic device 10 may include a panel 10A and a backlight source 10B, and the panel 10A may be disposed on the backlight source 10B. In some embodiments, the panel 10A may include a first substrate 102a, a second substrate 102b, and a liquid-crystal layer 110. The first substrate 102a may be adjacent to the backlight source 10B, the second substrate 102b may be opposite to the first substrate 102a, and the liquid-crystal layer 110 may be disposed between the first substrate 102a and the second substrate 102b. In some embodiments, the material of the first substrate 102a and/or the second substrate 102b may include glass, quartz, sapphire, ceramics, polyimide (PI), liquid-crystal polymer (LCP) material, polycarbonate (PC), photo sensitive polyimide (PSPI), polyethylene terephthalate (PET), other suitable materials or a combination thereof, but it is not limited thereto.

In some embodiments, the liquid-crystal layer 110 may include liquid crystal, other suitable modulating materials, or a combination thereof. In some embodiments, the liquid crystal may include nematic liquid crystal, smectic liquid crystal, cholesteric liquid crystal, blue phase liquid crystal, other suitable liquid-crystal materials, or a combination thereof, but it is not limited thereto. The electronic device 10 may include, but is not limited to, a twisted nematic (TN) type liquid-crystal device, a super twisted nematic (STN) type liquid-crystal device, a vertical alignment (VA) type liquid-crystal device, an in-plane switching (IPS) type liquid-crystal device, a cholesterol type liquid-crystal device, a blue phase type liquid-crystal device, a fringe field switching (FFS) type liquid-crystal device, a nano-protrusion vertical alignment (NPVA) type liquid-crystal device, other suitable liquid-crystal device, or a combination thereof.

In some embodiments, the liquid-crystal layer 110 may include a chiral dopant, for example, a left-handed chiral dopant or a right-handed chiral dopant. The chiral dopant can adjust the arrangement and/or rotation characteristics of the liquid-crystal molecules, so that the liquid-crystal molecules located in certain areas (for example, the dark-band areas) may rotate slightly due to the optical rotation of the chiral dopant, and provide phase retardation for certain areas (for example, the dark-band areas). The brightness of those certain areas (for example, the dark-band areas) therefore may be increased, and the transmittance of the electronic device may be improved. When an electronic device is applied with a voltage to form an electric field, the liquid-crystal molecules located on certain areas rotate less, that is, the liquid-crystal molecules in these certain areas provide less phase retardation, and these areas are defined as dark-band areas. The dark-band area may correspond to, for example, the area of the main portion 130m of the patterned electrode 130, but it is not limited thereto. The main portion 130m will be described in detail later.

As shown in FIG. 1A, in some embodiments, the panel 10A may include a first polarizing plate 120a and a second polarizing plate 120b. In some embodiments, the first polarizing plate 120a may be adjacent to the backlight source 10B, the first polarizing plate 120a may be disposed between the backlight source 10B and the first substrate 100a, and the second polarizing plate 120b may be disposed on the second substrate 100b, but they are not limited thereto. In some embodiments, the first polarizing plate 120a may be disposed on the outer side of the first substrate 100a (that is, the side that is away from the liquid-crystal layer 110). In some embodiments, the second polarizing plate 120b may be disposed on the outer side of the second substrate 100b (that is, the side that is away from the liquid-crystal layer 110). In some embodiments (not illustrated), the first polarizing plate 120a may be disposed on the inner side of the first substrate 100a (that is, the side that is adjacent to the liquid-crystal layer 110), and the second polarizing plate 120b may be disposed on the inner side of the second substrate 100b (that is, the side that is adjacent to the liquid-crystal layer 110).

In some embodiments, the first polarizing plate 120a and/or the second polarizing plate 120b may a include polyvinyl alcohol (PVA) film, a tri-acetyl cellulose (TAC) film, a pressure sensitive adhesive film, a protective film, a release film, other suitable materials, or a combination thereof, but it is not limited thereto.

As shown in FIG. 1A, in some embodiments, the panel 10A may include a patterned electrode 130, and the patterned electrode 130 may be disposed between the first substrate 100a and the liquid-crystal layer 110. In some embodiments, the electronic device may include an opposite electrode (not illustrated), and the opposite electrode may be disposed opposite to the patterned electrode 130. In some embodiments, the opposite electrode and the patterned electrode 130 may be respectively disposed on different sides of the liquid-crystal layer 130. In some embodiments, when the patterned electrode 130 is a pixel electrode, the opposite electrode may be a common electrode, but it is not limited thereto. In some other embodiments, the patterned electrode 130 may be a common electrode, and the opposite electrode may be a pixel electrode. In some embodiments, the patterned electrode 130 may have a plurality of openings. The configuration and aspect of the patterned electrode 130 will be described in detail below. In some embodiments, the opposite electrode (not illustrated) may be an unpatterned electrode, but it is not limited thereto. In some embodiments, the patterned electrode 130 and/or the opposite electrode may include a metal material, a transparent conductive material, other suitable materials, or a combination thereof, but it is not limited thereto. In some embodiments (not illustrated), the panel 10A may include an alignment layer, a driving circuit layer, a color filter layer, a light-shielding layer, or a spacer layer, but it is not limited thereto.

In the embodiment of FIG. 1A, the patterned electrode 130 may be disposed between the first substrate 100a and the liquid-crystal layer 110. When the first substrate 100a is an array substrate, the patterned electrode 130 may be, for example, a pixel electrode, and the opposite electrode may be a common electrode, but it is not limited thereto. The array substrate may include a driving circuit layer, for example, including transistors, capacitors, scan lines, data lines, and/or other circuit elements.

Figure 1C:
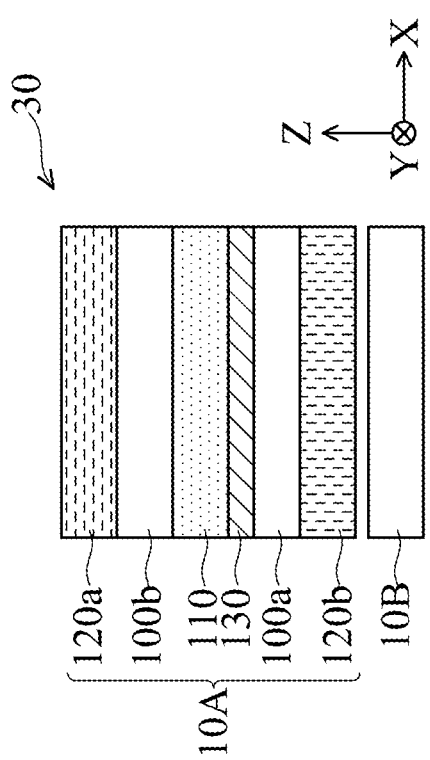

Next, refer to FIG. 1B, FIG. 1C, and FIG. 1D. FIG. 1B, FIG. 1C, and FIG. 1D respectively are cross-sectional diagrams of an electronic device 20, an electronic device 30, and an electronic device 40 in accordance with some other embodiments of the present disclosure. It should be understood that the same or similar components (or elements) in the following paragraph will be denoted by the same or similar reference numbers, and their materials, manufacturing methods and functions are the same or similar to those described above, and thus they will not be repeated in the following context.

The electronic device 20 shown in FIG. 1B is similar to the electronic device 10 shown in FIG. 1A. The difference between the electronic device 20 and the electronic device 10 is that the patterned electrode 130 is disposed between the second substrate 100b and the liquid-crystal layer 110. In the embodiment shown in FIG. 1B, for example, when the first substrate 100a is an array substrate, the patterned electrode 130 may be a common electrode, and the opposite electrode may be a pixel electrode, but they are not limited thereto.

The electronic device 30 shown in FIG. 1C is similar to the electronic device 10 shown in FIG. 1A. The difference between the electronic device 30 and the electronic device 10 is that the positions of the second polarizing plate 120b and the first polarizing plate 120a are exchanged. In other words, the second polarizing plate 120b may be adjacent to the backlight source 10B, the second polarizing plate 120b may be disposed between the first substrate 100a of the backlight source 10B, and the first polarizing plate 120a may be disposed on the second substrate 100b, but they are not limited thereto.

The electronic device 40 shown in FIG. 1D is similar to the electronic device 20 shown in FIG. 1B. The difference between the electronic device 40 and the electronic device 20 is that the positions of the second polarizing plate 120b and the first polarizing plate 120a are exchanged. In other words, the second polarizing plate 120b may be adjacent to the backlight source 10B, the second polarizing plate 120b may be disposed between the first substrate 100a of the backlight source 10B, and the first polarizing plate 120a may be disposed on the second substrate 100b.

Figure 2:
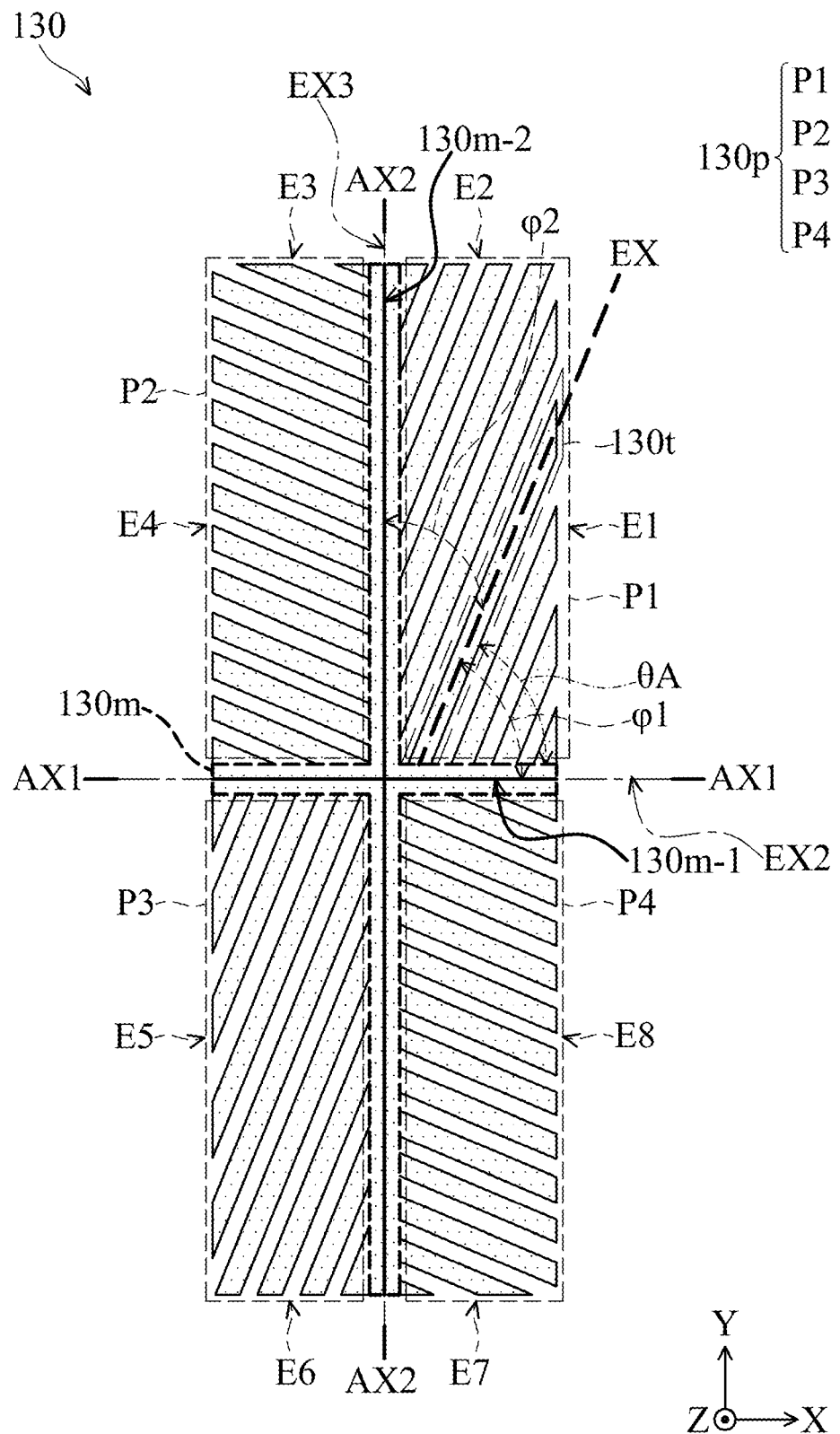
FIG. 2 is a top-view diagram of the patterned electrode of an electronic device in accordance with some embodiments of the present disclosure.

Next, refer to FIG. 2, which is a top-view diagram of the patterned electrode 130 of an electronic device in accordance with some embodiments of the present disclosure. In order to clearly illustrate the arrangement relationship between the patterned electrode 130 and the first polarizing plate 120a and the second polarizing plate 120b, FIG. 2 only illustrates the dashed lines to indicate the absorption axis directions of the first polarizing plate 120a and the second polarizing plate 120b, and does not illustrate the first polarizing plate 120a and the second polarizing plate 120b. It should be noted that the "top-view diagram of the patterned electrode" described in the present disclosure refers to the viewing angle viewed from the side of the electronic device that is away from the backlight source 10B, for example, the viewing angle viewed from the display surface of the electronic device.

As shown in FIG. 2, in some embodiments, the first polarizing plate 120a has a first absorption axis AX1, the second polarizing plate 120b has a second absorption axis AX2, and the first absorption axis AX1 may be substantially perpendicular to the second absorption axis AX2. For example, in some embodiments, the first absorption axis AX1 may be the absorption axis of the lower polarizing plate (as shown in FIG. 1A or FIG. 1B), or may be the absorption axis of the upper polarizing plate of the panel 10A (as shown in FIG. 1C or FIG. 1D), and the second absorption axis AX2 may be the absorption axis of the polarizing plate opposite to it. In some embodiments, the patterned electrode 130 may have a main portion 130m and at least one (or a plurality of) sub-portions 130p. The main portion 130m may define different sub-portions 130p of the patterned electrode 130, for example, a first sub-portion P1, a second sub-portion P2, a third sub-portion P3 and/or a fourth sub-portion P4, but it is not limited thereto. For example, as shown in FIG. 2, the first sub-portion P1, the second sub-portion P2, the third sub-portion P3, and the fourth sub-portion P4 may be arranged in a counterclockwise manner. In some embodiments, the second sub-portion P2 and the fourth sub-portion P4 may be arranged substantially in a diagonal manner, and the third sub-portion P3 and the first sub-portion P1 may be arranged substantially in a diagonal manner, but they are not limited thereto. In some embodiments, the main portion 130m may have a cross shape, an X shape (which is not shown in FIG. 2, referring to the following context), or other suitable shapes, but it is not limited thereto.

As shown in FIG. 2, in some embodiments, at least one sub-portion (e.g., the first sub-portion P1, the second sub-portion P2, the third sub-portion P3, and/or the fourth sub-portion P4) may include a plurality of branch portions 130t. In some embodiments, the branch portions 130t may be connected to the main portion 130m and extend in a direction away from the main portion 130m, but it is not limited thereto. In some embodiments, the extending directions of the branch portions 130t located in the same sub-portion 130p may be substantially the same, but they are not limited thereto. It should be understood that "an extending direction" of an element may refer to an extending direction of a long axis of the element. In some embodiments, the first sub-portion P1, the second sub-portion P2, the third sub-portion P3, and the fourth sub-portion P4 each may include two edges, and the two edges may be substantially perpendicular to each other, but they are not limited thereto. Specifically, when the patterned electrode 130 includes four sub-portions, the first sub-portion P1 may include a first edge E1 and a second edge E2 (which is substantially perpendicular to the first edge E1), the second sub-portion P2 may include a third edge E3 and a fourth edge E4 (which is substantially perpendicular to the third edge E3), the third sub-portion P3 may include a fifth edge E5 and a sixth edge E6 (which is substantially perpendicular to the fifth edge E5), and the fourth sub-portion P4 may include a seventh edge E7 and an eighth edge E8 (which is substantially perpendicular to the seventh edge E7), but they are not limited thereto. It should be noted that in the above embodiment, the first edge E1, the second edge E2, the third edge E3, the fourth edge E4, the fifth edge E5, the sixth edge E6, the seventh edge E7, and the eighth edge E8, for example, may be arranged in a counterclockwise manner.

As shown in FIG. 2, in some embodiments, in the viewing angle viewed from the display surface of the electronic device, there is a first included angle $\varphi 1$ between one of the plurality of branch portions of at least one sub-portion (for example, but is not limited to the first sub-portion P1); and there is a second included angle $\varphi 2$ between the one of the plurality of branch portions 130t and the second absorption axis AX2. In some embodiments, the sum of the first included angle $\varphi$ and the second included angle $\varphi 2$ may be substantially 90 degrees, but it is not limited thereto. It should be understood that the first included angle $\varphi 1$ refers to the included angle between an extending direction EX of the branch portion 130t and the extending direction of the first absorption axis AX1 (e.g., the X direction in FIG. 2) in the clockwise direction. In addition, the second included angle $\varphi 2$ refers to the included angle between the extending direction EX of the branch portion 130t and the extending direction of the second absorption axis AX2 (e.g., the Y direction in FIG. 2) in the counterclockwise direction.

In some embodiments, the liquid-crystal layer 110 may include a left-handed chiral dopant, the patterned electrode 130 may be disposed between the first substrate 100a and the liquid-crystal layer 110 (for example, as shown in the embodiments of FIG. 1A or FIG. 1C), and the first included angle $\varphi 1$ may be greater than the second included angle $\varphi 2$. In some other embodiments, the liquid-crystal layer 110 may include a left-handed chiral dopant, the patterned electrode 130 may be disposed between the second substrate 100b and the liquid-crystal layer 110 (for example, as shown in the embodiments of FIG. 1B or FIG. 1D), and the first included angle $\varphi 1$ may be smaller than the second included angle $\varphi 2$.

In some embodiments, the liquid-crystal layer 110 may include a right-handed chiral dopant, the patterned electrode 130 may be disposed between the first substrate 100a and the liquid-crystal layer 110 (for example, as shown in the embodiments of FIG. 1A or FIG. 1C), and the first included angle $\varphi 1$ may be smaller than the second included angle $\varphi 2$. In some other embodiments, the liquid-crystal layer 110 may include a right-handed chiral dopant, the patterned electrode 130 may be disposed between the second substrate 100b and the liquid-crystal layer 110 (for example, as shown in the embodiments of FIG. 1B or FIG. 1D), and the first included angle $\varphi 1$ may be greater than the second included angle $\varphi 2$.

In accordance with the embodiments of the present disclosure, according to difference of the chiral dopant (e.g., a left-handed chiral dopant or a right-handed chiral dopant) that is used in the liquid-crystal layer 130 or the position of the patterned electrode 130 (e.g., disposed between the first substrate 100a and the liquid-crystal layer 110, or between the second substrate 100b and the liquid-crystal layer 110), the relationship between the first included angle $\varphi 1$ and the second included angle $\varphi 2$ may be adjusted as described above. Through the above adjustment, the angle between the average orientation of the liquid crystal and the direction of the absorption axis of the polarizing plate can be may be about 45 degrees, thereby improving the transmittance or brightness uniformity of the panel.

Although in the embodiment shown in FIG. 2, the first included angle $\varphi 1$ and the second included angle $\varphi 2$ are only labeled in the first sub-portion P1 of the patterned electrode 130, but the present disclosure is not limited thereto. In some embodiments, the design of the patterned electrode 130 (branch portions 130t) of the second sub-portion P2, the third sub-portion P3 and/or the fourth sub-portion P4 may also conform to the aforementioned relationship of the first included angle $\varphi 1$ and second included angle. In addition, the definition of the first included angle $\varphi 1$ and the second included angle $\varphi 2$ are similar to those described above.

Figure 3:
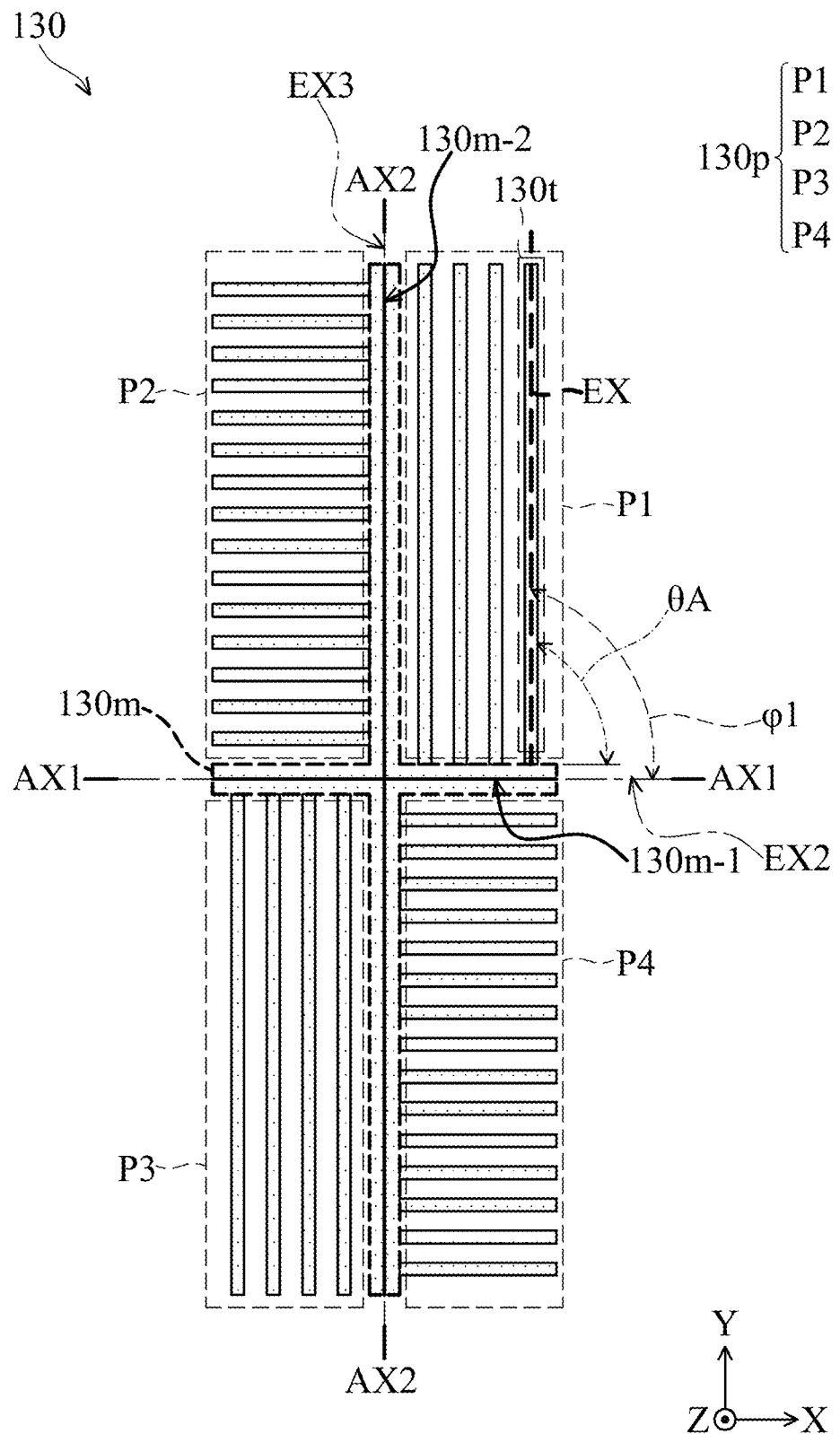
FIG. 3 is a top-view diagram of the patterned electrode of an electronic device in accordance with some embodiments of the present disclosure.

Refer to FIG. 3, which is a top-view diagram of the patterned electrode 130 of an electronic device in accordance with some embodiments of the present disclosure. As shown in FIG. 3, in some embodiments, the extending direction of the branch portions 130t in the first sub-portion P1 and/or the third sub-portion P3 of the patterned electrode 130 may be substantially perpendicular to the first absorption axis AX1 (that is, substantially parallel to the second absorption axis AX2). In addition, the extending direction of the branch portions 130t in the second sub-portion P2 and/or the fourth sub-portion P4 may be substantially perpendicular to the second absorption axis AX2 (that is, substantially parallel to the first absorption axis AX1). In some embodiments, the extending direction of the branch portions 130t in the first sub-portion P1 (and/or the third sub-portion P3) may be perpendicular to the extending direction of the branch portions 130t in the second sub-portion P2 (and/or the fourth sub-portion P4). In some embodiments, the number of branch portions 130t in the first sub-portion P1 (and/or the third sub-portion P3) may be different from the number of branch portions 130t in the second sub-portion P2 (and/or the fourth sub-portion P4).

As shown in FIG. 3, in this embodiment, the sum of the first included angle $\varphi 1$ (may be about 90 degrees) between at least one branch portion 130t in the sub-portion and the first absorption axis AX1 and the second included angle $\varphi 2$ (may be about 0 degree, not labeled) between the branch portion 130t and the second absorption axis AX2 may be about 90 degrees. In addition, the relationship between the first included angle $\varphi 1$ and the second included angle $\varphi 2$ may also change according to the different positions of the patterned electrode 130 and the characteristics of the chiral dopant in the liquid-crystal layer 110 as described above, and thus will not be repeated herein.

Figure 4A:
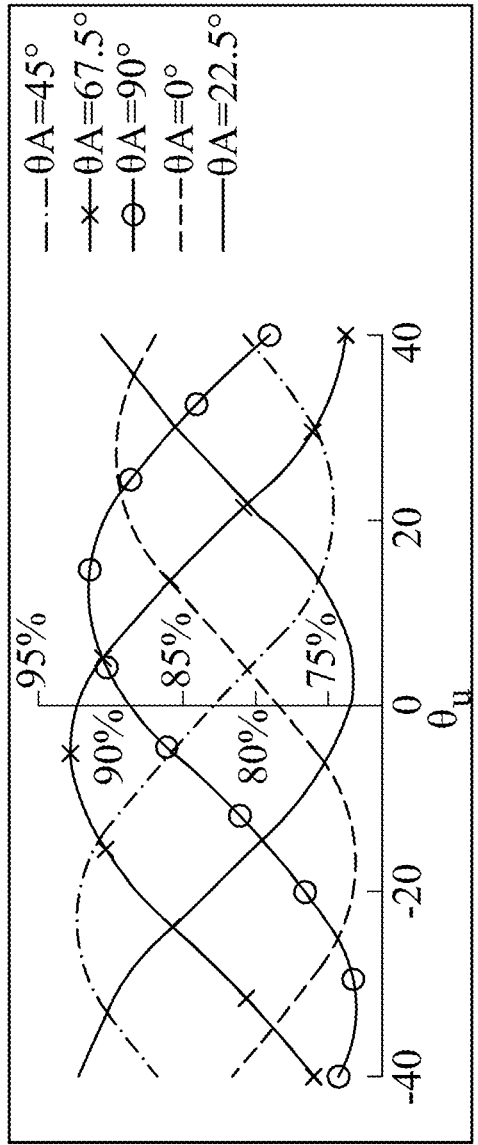
FIG. 4A is a diagram showing the relationship between the arrangement angle of the polarizing plate and the transmittance of an electronic device in accordance with some embodiments of the present disclosure.

Next, refer to FIG. 4A, which is a diagram showing the relationship between the arrangement angle of the polarizing plate and the transmittance of an electronic device in accordance with some embodiments of the present disclosure. For example, FIG. 4A is a diagram showing the transmittance change of different included angles θA of the electrodes and different arrangement angles θu of the absorption axis of the upper polarizing plate in the following condition: when the liquid-crystal layer 110 of the electronic device includes a left-handed chiral dopant, the patterned electrode 130 is disposed between the first substrate 100a and the liquid-crystal layer 110, and the included angle between the absorption axis of the lower polarizing plate and the upper polarizing plate of the electronic device is maintained at about 90 degrees (that is, the included angle between the first absorption axis AX1 and the second absorption axis AX2 is about 90 degrees). The aforementioned included angle θA of the electrodes (as shown in FIG. 2) may be defined as the included angle between an extending direction EX2 of a short axis portion 130m-1 of the main portion 130m and the extending direction EX of one of the plurality of branch portions 130t. In the embodiment shown in FIG. 2, an extending direction EX3 of a long axis portion 130m-2 of the main portion 130m may be substantially perpendicular to the extending direction EX2 of the short axis portion 130m-1. As shown in FIG. 4A, it shows the transmittance curves under different included angles θA of the electrodes (for example, 0 degree, 22.5 degrees, 45 degrees, 67.5 degrees, 90 degrees), and under different arrangement angles θu of the absorption axis of the upper polarizing plate (for example, the angles of axis of abscissa in FIG. 4A). When the arrangement angle θu of the absorption axis of the polarizing plate is 0 degree, the extending direction of the absorption axis is defined as substantially extending in the X direction (refer to FIG. 2). When the extending direction of the absorption axis rotates counterclockwise by 20 degrees (or 40 degrees), the arrangement angle θu is 20 degrees (or 40 degrees). On the contrary, when the extending direction of the absorption axis rotates clockwise by about 20 degrees (or 40 degrees), the arrangement angle θu is −20 degrees (or −40 degrees). It should be noted that, as shown in FIG. 4A, the maximum transmittance can be obtained under different included angles θA of the electrodes and the arrangement angles θu of the absorption axis of the upper polarizing plate (the transmittance is about 90% to about 95%, but it is not limited thereto). Therefore, according to the result of FIG. 4A, when the included angle θA of the electrodes is fixed, a better transmittance can be achieved by adjusting the arrangement angle θu of the upper polarizing plate. Alternatively, when the arrangement angle θu is fixed, a better transmittance can be achieved by adjusting the included angle θA of the electrodes. For example, when the arrangement angle θu is fixed at 0 degree, the included angle θA of the electrodes can be designed to be about 70 degrees to obtain a better transmittance performance, but it is not limited thereto.

Figure 4B:
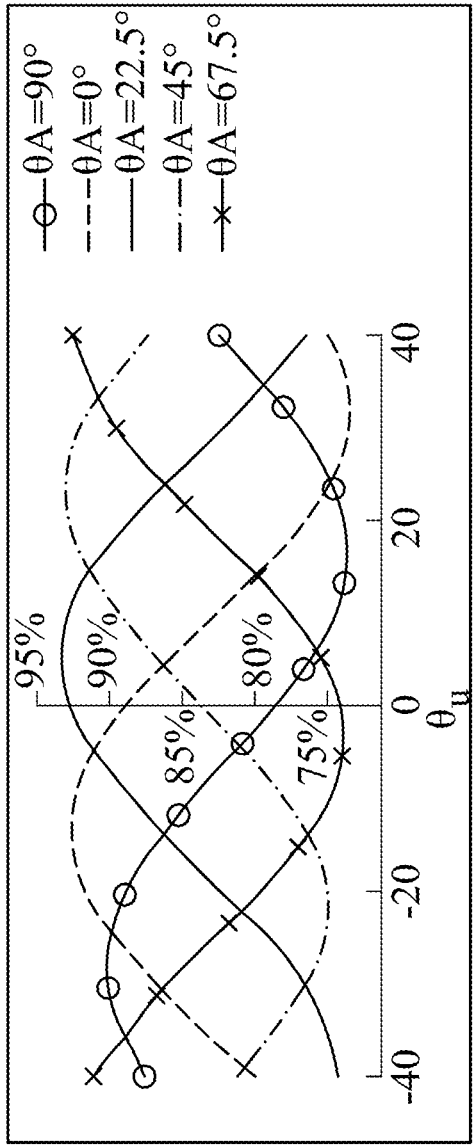
FIG. 4B is a diagram showing the relationship between the arrangement angle of the polarizing plate and the transmittance of an electronic device in accordance with some embodiments of the present disclosure.

Next, FIG. 4B shows a diagram showing the relationship between the arrangement angle of the polarizing plate and the transmittance of an electronic device in accordance with some embodiments of the present disclosure. For example, FIG. 4B is a diagram showing the transmittance change of different included angles θA of the electrodes and different arrangement angles θu of the absorption axis of the upper polarizing plate in the following condition: when the liquid-crystal layer 110 of the electronic device includes a right-handed chiral dopant, the patterned electrode 130 is disposed between the first substrate 100a and the liquid-crystal layer 110, and the included angle between the absorption axis of the lower polarizing plate and the upper polarizing plate of the electronic device is maintained at about 90 degrees (that is, the included angle between the first absorption axis AX1 and the second absorption axis AX2 is about 90 degrees). The definition of the included angle θA of the electrodes and the arrangement angle θu are the same as that described above. As shown in FIG. 4B, the maximum transmittance can be obtained under different included angles θA of the electrodes and the arrangement angles θu (the transmittance is about 90% to about 95%, but it is not limited thereto). Therefore, according to the result of FIG. 4B, when the included angle θA of the electrodes is fixed, a better transmittance can be achieved by adjusting the arrangement angle θu of the upper polarizing plate. Alternatively, when the arrangement angle θu is fixed, a better transmittance can be achieved by adjusting the included angle θA of the electrodes. In some embodiments, the transmittance of the electronic device can be measured by a spectrometer or other instrument that can measure brightness. For example, the transmittance of the electronic derives can be measured when the panel 10A and the backlight source 10B are assembled.

Figure 5:
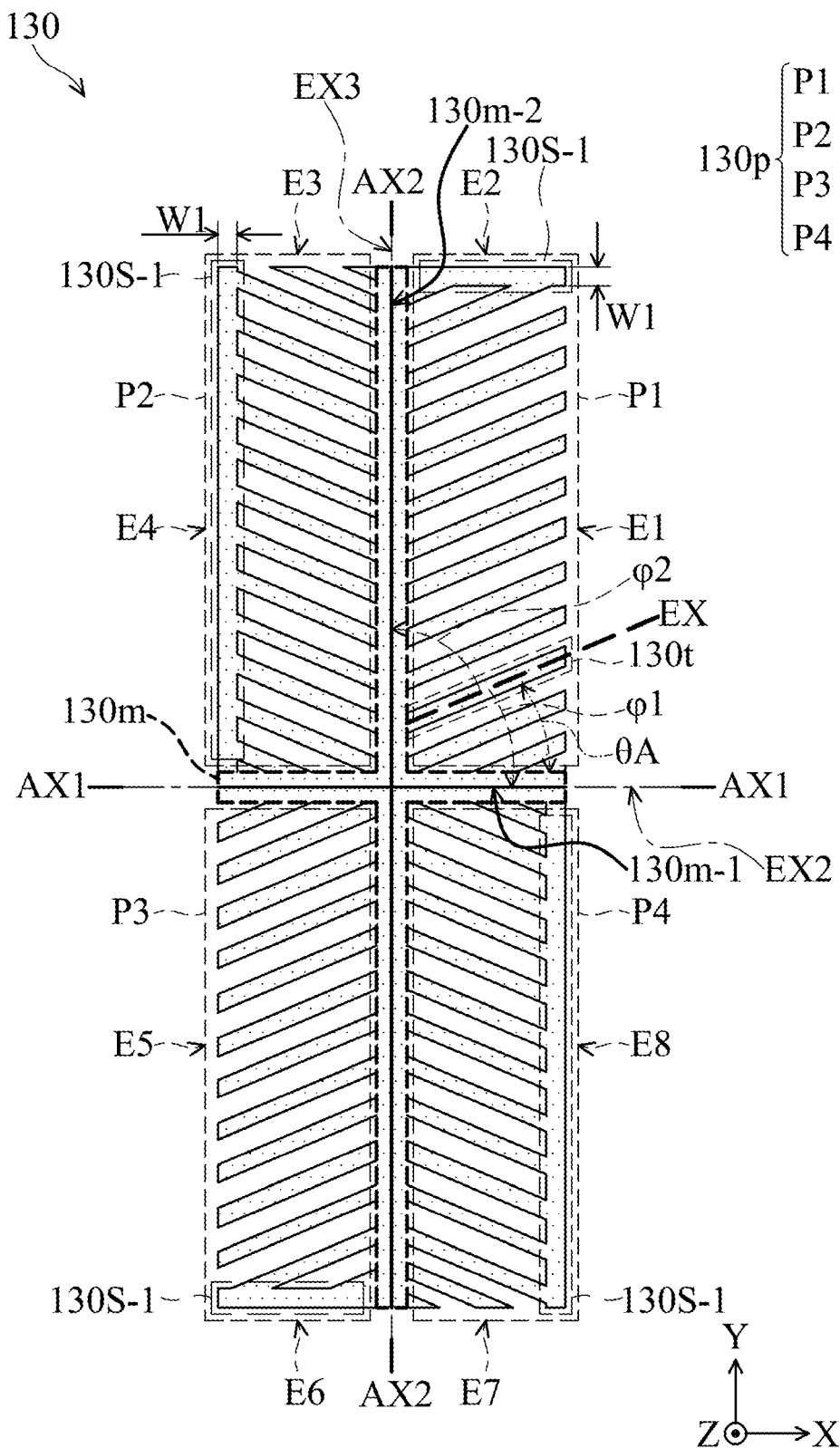
FIG. 5 is a top-view diagram of the patterned electrode of an electronic device in accordance with some embodiments of the present disclosure.
Figure 6:
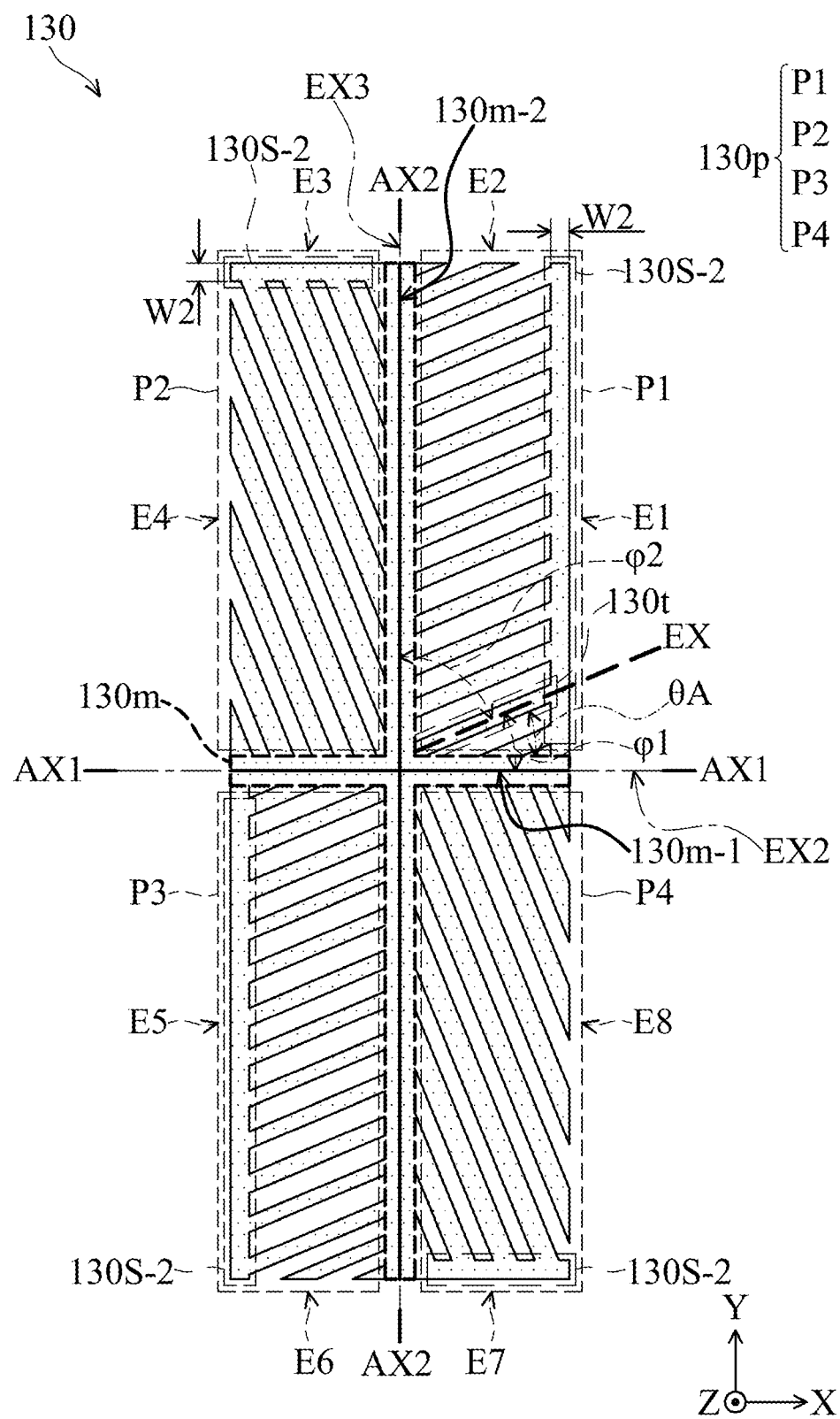
FIG. 6 is a top-view diagram of the patterned electrode of an electronic device in accordance with some embodiments of the present disclosure.

Next, refer to FIG. 5 and FIG. 6. FIG. 5 is a top-view diagram of the patterned electrode 130 of an electronic device in accordance with some other embodiments of the present disclosure. FIG. 6 is a top-view diagram of the patterned electrode 130 of an electronic device in accordance with some other embodiments of the present disclosure. In some embodiments, at least a portion of the sub-portion 130p (the first sub-portion P1, the second sub-portion P2, the third sub-portion P3, and/or the fourth sub-portion P4) may include a peripheral portion. For example, at least a portion of the sub-portion 130p may include at least one first peripheral portion 130S-1 (as shown in FIG. 5) and/or at least one second peripheral portion 130S-2 (as shown in FIG. 6), but it is not limited thereto. It should be noted that the first peripheral portion 130S-1 may be defined as the peripheral portion of the patterned electrode 130 corresponding to the even-numbered edges as described above. The even-numbered edges include, for example, the aforementioned second edge E2, fourth edge E4, sixth edge E6, and/or eighth edge E8. It should be noted that the second peripheral portion 130S-2 may be defined as the peripheral portion of the patterned electrode 130 corresponding to the odd-numbered edge as described above. The odd-numbered edges include, for example, the aforementioned first edge E1, third edge E3, fifth edge E5, and/or seventh edge E7. In some embodiments, the first peripheral portion 130S-1 and/or the second peripheral portion 130S-2 may be connected to the main portion 130m and/or at least one branch portion 130t. It should be noted that, due to the influence of the chiral dopant on the arrangement of the liquid crystal located at the peripheral edges of the patterned electrode 130, dark bands may be generated. For example, taking the liquid-crystal layer 110 containing a left-handed chiral dopant as an example, when the patterned electrode 130 is disposed between the first substrate 100a and the liquid-crystal layer 110, dark bands may occur at the even-numbered edges of the patterned electrode 130; and when the electrode 130 is disposed between the second substrate 100b and the liquid-crystal layer 110, dark bands may occur at the odd-numbered edges of the pattern electrode 130. On the contrary, taking the liquid-crystal layer 110 containing a right-handed chiral dopant as an example, when the patterned electrode 130 is disposed between the first substrate 100a and the liquid-crystal layer 110, dark bands may occur at the odd-numbered edges of the patterned electrode 130; and when the electrode 130 is disposed between the second substrate 100b and the liquid-crystal layer 110, dark bands may occur at even-numbered edges of the patterned electrode 130. Therefore, in accordance with the embodiments of the present disclosure, based on the different optical rotation of the chiral dopant and the different positions where the patterned electrode 130 is disposed, the patterned electrode 130 may be designed to have the first peripheral portion 130S-1 and/or the second peripheral portion 130S-2, so that the occurrence of dark bands on the edges may be reduced or the brightness uniformity of the panel may be improved. For example, when dark bands occur at the even-numbered edges of the patterned electrode 130, the patterned electrode 130 can be designed to have at least one first peripheral portion 130S-1 (corresponding to the peripheral portion of the even-numbered edge as described above) to reduce the occurrence of dark bands at the even-numbered edges, but it is not limited thereto. When dark bands occur at the odd-numbered edges of the patterned electrode 130, the patterned electrode 130 can be designed to have at least one second peripheral portion 130S-2 (corresponding to the peripheral portion of the odd-numbered edge as described above) to reduce the occurrence of dark bands at the odd-numbered edges, but it is not limited thereto.

Specifically, in some embodiments (as shown in FIG. 5), when the liquid-crystal layer 110 includes a left-handed chiral dopant, and the patterned electrode 130 is disposed between the first substrate 100a and the liquid-crystal layer 110, at least some of the sub-portions (the first sub-portion P1, the second sub-portion P2, the third sub-portion P3, and/or the fourth sub-portion P4) may include the first peripheral portion 130S-1 (the peripheral portion disposed on the even-numbered edge), but it is not limited thereto. In some other embodiments (as shown in FIG. 5), when the liquid-crystal layer 110 includes a right-handed chiral dopant, and the patterned electrode 130 is disposed between the second substrate 100b and the liquid-crystal layer 110, at least some of the sub-portions (the first sub-portion P1, the second sub-portion P2, the third sub-portion P3, and/or the fourth sub-portion P4) may include the first peripheral portion 130S-1 (the peripheral portion disposed on the even-numbered edge), but it is not limited thereto.

Specifically, in some embodiments (as shown in FIG. 6), when the liquid-crystal layer 110 includes a left-handed chiral dopant, and the patterned electrode 130 is disposed between the second substrate 100b and the liquid-crystal layer 110, at least some of the sub-portions (the first sub-portion P1, the second sub-portion P2, the third sub-portion P3, and/or the fourth sub-portion P4) may include the second peripheral portion 130S-2 (the peripheral portion disposed on the odd-numbered edge), but it is not limited thereto. In some embodiments (as shown in FIG. 6), when the liquid-crystal layer 110 includes a right-handed chiral dopant, and the patterned electrode 130 is disposed between the first substrate 100a and the liquid-crystal layer 110, the first sub-portion P1, the second sub-portion P2, the third sub-portion P3, and/or the fourth sub-portion P4 may include the second peripheral portion 130S-2 (the peripheral portion disposed on the odd-numbered edge), but it is not limited thereto.

In some embodiments, a width W1 of the first peripheral portion 130S-1 and/or a width W2 of the second peripheral portion 130S-2 may be in a range from 1 micrometer (μm) to 7 micrometers (i.e. 1 μm≤width W1 (or width W2)≤7 μm), or from 3 μm to 7 μm (i.e. 3 μm≤width W1 (or width W2)≤7 μm), or from 4 μm to 6 μm (i.e. 4 μm≤width W1 (or width W2)≤6 μm), for example, 4 μm, 5 μm, or 6 μm. It should be noted that if the width W1 of the first peripheral portion 130S-1 or the width W2 of the second peripheral portion 130S-2 is too small (for example, smaller than 1 μm), the effect of reducing peripheral dark bands may not be significant. On the other hand, if the width W1 of the first peripheral portion 130S-1 or the width W2 of the second peripheral portion 130S-2 is too large (for example, greater than 7 μm), the in-plane liquid crystal arrangement may be affected, or the transmittance may be reduced. The aforementioned width W1 refers to the maximum width of the first peripheral portion 130S-1 in a direction perpendicular to its extending direction. The aforementioned width W2 refers to the maximum width of the second side portion 130S-2 in the direction perpendicular to the extending direction.

In accordance with the embodiments of the present disclosure, an optical microscopy (OM), a scanning electron microscope (SEM), a film thickness profiler (α-step), an ellipsometer or other suitable methods may be used to measure the thickness, width, length, or angle of the element or the distance between elements.

Figure 7:
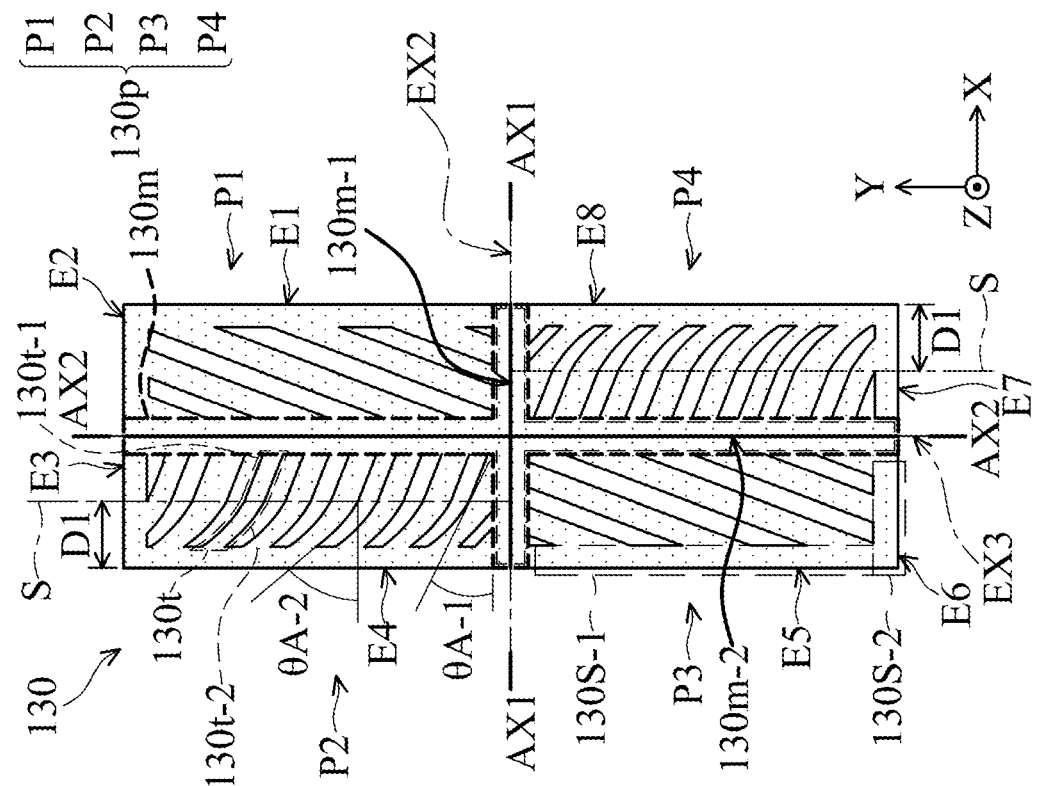
FIG. 7 is a top-view diagram of the patterned electrode of an electronic device in accordance with some embodiments of the present disclosure.

Next, refer to FIG. 7, which is a top-view diagram of the patterned electrode 130 of an electronic device in accordance with some other embodiments of the present disclosure. As shown in FIG. 7, in some embodiments, the branch portions 103t of a sub-portion of the patterned electrode 130 (for example, the first sub-portion P1, the second sub-portion P2, the third sub-portion P3, and/or the fourth sub-portion P4) may include, for example, a first branch portion 130t-1 and a second branch portion 130t-2. The first branch portion 130t-1 may be connected to the main portion 130m, and the second branch portion 130t-2 may be connected to an end of the first branch portion 130t-1 that is away from the main portion 130t. In some embodiments, the first branch portion 130t-1 may be, for example, an oblique straight line, and the second branch portion 130t-2 may be, for example, a curved line, but they are not limited thereto. In other words, the branch portions 130t may be bent or deformed in the area close to the peripheral portion. For example, in some embodiments, the first branch portion 130t-1 and the second branch portion 130t-2 may extend in different directions. In some embodiments, there is a connection interface S between the first branch portion 130t-1 and the second branch portion 130t-2, and the outermost edge of the first peripheral portion 130S-1 or the second peripheral portion 130S-2 and the connection interface S may be separated by a distance D1. In some embodiments, the distance D1 may be defined as the maximum distance between the outermost edge of the first peripheral portion 130S-1 or the second peripheral portion 130S-2 and the connection interface S in the X direction (for example, the direction of the extending direction of the short side of the patterned electrode 130). In some embodiments, the distance D1 may be in a range from 4 μm to 12 μm (i.e. 4 μm≤distance D1≤12 μm), from 5 μm to 10 μm (i.e. 5 μm≤distance D1≤10 μm), or from 6 μm to 9 μm (i.e. 6 μm≤distance D1≤9 μm), for example, 7 μm or 8 μm, but it is not limited thereto. In some embodiments, there may be an angle θA-1 between the extending direction of the first branch portion 130t-1 and the extending direction EX2 of the short axis portion 130m-1. There may be an included angle θA-2 between the extending direction of the second branch portion 130t-2 and the extending direction EX2 of the short axis portion 130m-1. In addition, the included angle θA-1 may be different from the included angle θA-2. In some embodiments, the included angle θA-1 may be less than or equal to the included angle θA-2. In some embodiments, the included angle θA-1 may be in a range from 10 degrees to 30 degrees (i.e. 10 degrees≤the included angle θA-1≤30 degrees), for example, 20 degrees or 25 degrees, but it is not limited thereto. In some embodiments, the included angle θA-2 may be in a range from 30 degrees to 80 degrees (i.e. 30 degrees≤included angle θA-2≤80 degrees), or from 40 degrees to 70 degrees (i.e. 40 degrees≤included angle θA-2≤70 degrees), for example, 50 degrees, 60 degrees, or 70 degrees, but it is not limited thereto. In some embodiments, when the liquid-crystal layer 110 includes a left-handed chiral dopant, and the patterned electrode 130 is disposed between the first substrate 100a and the liquid-crystal layer 110, the branch portions 130t located in the second sub-portion P2 and/or the fourth sub-portion P4 may be bent or deformed in the area close to the peripheral portion. That is, the branch portions 130t located in the second sub-portion P2 and/or the fourth sub-portion P4 may, for example, have the first branch portion 130t-1 and the second branch portion 130t-2 as described above. In some embodiments, when the liquid-crystal layer 110 includes a left-handed chiral dopant, and the patterned electrode 130 is disposed between the second substrate 100b and the liquid-crystal layer 110, the branch portions 130t located in the first sub-portion P1 and/or the third sub-portion P3 may be bent or deformed in the area close to the peripheral portion. That is, the branch portions 130t located in the first sub-portion P1 and/or the third sub-portion P3 may, for example, have the first branch portion 130t-1 and the second branch portion 130t-2 as described above. In some embodiments, when the liquid-crystal layer 110 includes a right-handed chiral dopant, and the patterned electrode 130 is disposed between the first substrate 100a and the liquid-crystal layer 110, the branch portions 130t located in the first sub-portion P1 and/or the third sub-portion P3 may be bent or deformed in the area close to the peripheral portion. That is, the branch portions 130t located in the first sub-portion P1 and/or the third sub-portion P3 may, for example, have the first branch portion 130t-1 and the second branch portion 130t-2 as described above. In some embodiments, when the liquid-crystal layer 110 includes a right-handed chiral dopant, and the patterned electrode 130 is disposed between the second substrate 100b and the liquid-crystal layer 110, the branch portions 130t located in the second sub-portion P2 and/or the fourth sub-portion P4 may be bent or deformed in the area close to the peripheral portion. That is, the branch portions 130t located in the second sub-portion P2 and/or the fourth sub-portion P4 may, for example, have the first branch portion 130t-1 and the second branch portion 130t-2 as described above.

As shown in FIG. 7, in some embodiments, the first sub-portion P1, the second sub-portion P2, the third sub-portion P3, and the fourth sub-portion P4 of the patterned electrode 130 all may include peripheral portions (the first peripheral portion 130S-1 and second peripheral portion 130S-2). In some embodiments, the patterned electrode 130 may have two long sides and two short sides, and the patterned electrode 130 may have the first peripheral portion 130S-1 and the second peripheral portion 130S-2 on the two long sides, but it is not limited thereto. For example, the first edge E1 and the eighth edge E8 may form a long side, and the fourth edge E4 and the fifth edge E5 may form another long side. The second edge E2 and the third edge E3 may form a short side, and the sixth edge E6 and the seventh edge E7 form another short side.

It should be noted that when the aforementioned sub-portions include the first peripheral portion 130S-1 and the second peripheral portion 130S-2, the first peripheral portion 130S-1 and the second peripheral portion 130S-2 are connected to each other. In addition, the connection position between the first peripheral portion 130S-1 and the second peripheral portion 130S-2 may be optionally designed as an arc-shaped edge.

In some embodiments, the width of the main portion 130m may be greater than or equal to the width of the first peripheral portion 130S-1 and/or the second peripheral portion 130S-2, but it is not limited thereto. In some embodiments, the width of the main portion 130m may be smaller than or equal to the width of the first peripheral portion 130S-1 and/or the second peripheral portion 130S-2, but it is not limited thereto. In some embodiments, the width of the branch portion 130 may be smaller than or equal to the width of the first peripheral portion 130S-1 and/or the second peripheral portion 130S-2, but it is not limited thereto. For example, the aforementioned widths are defined as the maximum width of the element in the direction that is perpendicular to its extending direction.

Figure 8:
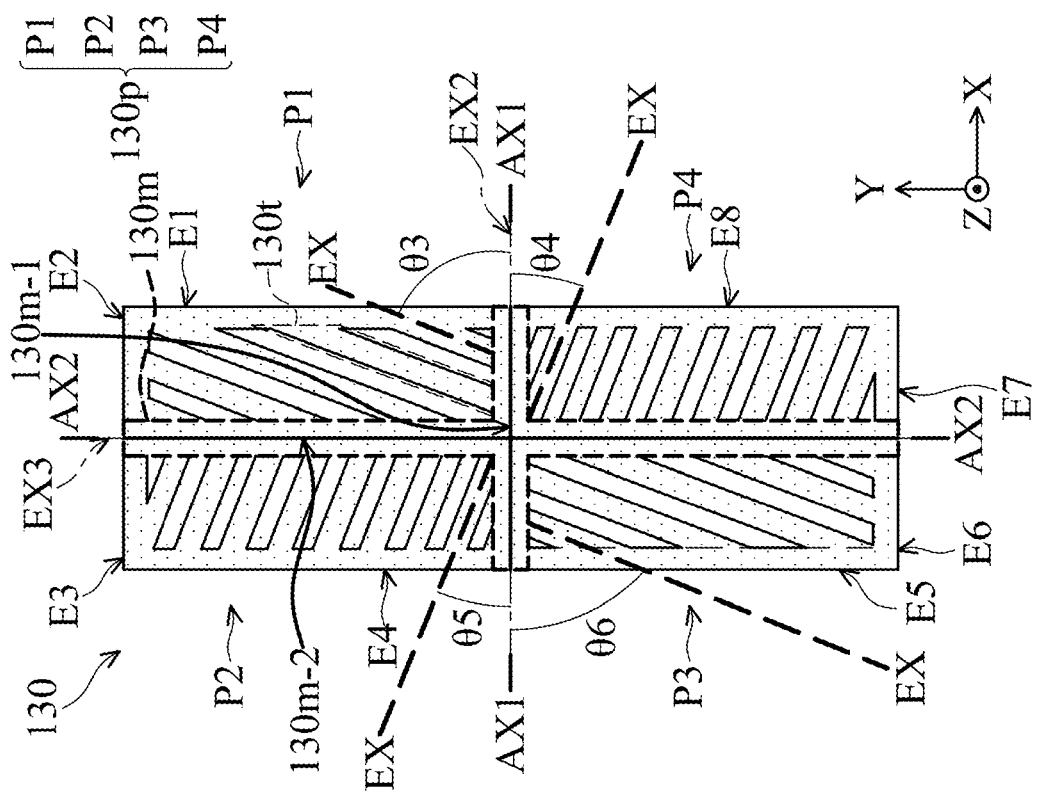
FIG. 8 is a top-view diagram of the patterned electrode of an electronic device in accordance with some embodiments of the present disclosure.

Next, refer to FIG. 8, which is a top-view diagram of the patterned electrode 130 of an electronic device in accordance with some other embodiments of the present disclosure. There may be an included angle θ3 between the extending direction EX of the branch portion 130t in the first sub-portion P1 and the extending direction EX2 of the short axis portion 130m-1 of the main portion 130m. There may be an included angle θ4 between the extending direction EX of the branch portion 130t in the fourth sub-portion P4 and the extending direction EX2 of the short axis portion 130m-1 of the main portion 130m. In some embodiments, the sum of the included angle θ3 and the included angle θ4 may be not equal to 90 degrees. For example, the sum of the included angle θ3 and the included angle θ4 may be in a range from 75 degrees to 105 degrees (75 degrees≤the sum of θ3 and θ4≤105 degrees), or from 80 degrees to 100 degrees (80 degrees≤the sum of θ3 and θ4≤100 degrees), but it is not limited thereto. There may be an included angle θ5 between the extending direction EX of the branch portion 130t in the second sub-portion P2 and the extending direction EX2 of the short axis portion 130m-1 of the main portion 130m. There may be an included angle θ6 between the extending direction EX of the branch portion 130t in the third sub-portion P3 and the extending direction EX2 of the short axis portion 130m-1 of the main portion 130m. In some embodiments, the sum of the included angle θ5 and the included angle θ6 may be not equal to 90 degrees. For example, the sum of the included angle θ5 and the included angle θ6 may be in a range from 75 degrees to 105 degrees (75 degrees≤the sum of θ5 and θ6≤105 degrees), or from 80 degrees to 100 degrees (80 degrees≤the sum of θ5 and θ6≤100 degrees), but it is not limited thereto. In some embodiments, the included angle θ3 may be substantially equal to the included angle θ6. In some embodiments, the included angle θ4 may be substantially equal to the included angle θ5.

Next, refer to FIG. 9 to FIG. 13, which are top-view diagrams of the patterned electrode 130 of an electronic device in accordance with some other embodiments of the present disclosure. FIG. 9 to FIG. 13 show various aspects of the patterned electrode 130 in accordance with different embodiments. In some embodiments, the main portion 130m of the patterned electrode 130 may have any suitable shape. As shown in FIG. 9 and FIG. 10, the main portion 130m may be an X shape, and it may divide the patterned electrode 130 into the first sub-portion P1, the second sub-portion P2, the third sub-portion P3, and the fourth sub-portion P4. The sizes of the main portions 130m shown in the embodiments of FIG. 9 and FIG. 10 are different. In some embodiments, the number of branch portions 130t in the first sub-portion P1, the second sub-portion P2, the third sub-portion P3, and/or the fourth sub-portion P4 may be the same or different. In addition, the included angle between the extending directions of the branch portion 130t in the adjacent sub-portions may be substantially 90 degrees. For example, the included angle between the extending direction (not labeled) of the branch portion 130t in the first sub-portion P1 and the extending direction (not labeled) of the branch portion 130t in the second sub-portion P2 (or the fourth sub-portion P4) may be substantially 90 degrees, but it is not limited thereto. In some embodiments, the sizes of the areas of the first sub-portion P1, the second sub-portion P2, the third sub-portion P3, and/or the fourth sub-portion P4 may be the same or different. For example, the sizes of the first sub-portion P1 and the third sub-portion P3 shown in FIG. 9 or FIG. 10 may be substantially the same, and the sizes of the second sub-portion P2 and the fourth sub-portion P4 may be substantially the same. The size of the first sub-portion P1 (or the third sub-portion P3) may be different from that of the second sub-portion P2 (or the fourth sub-portion P4), but it is not limited thereto.

Furthermore, as shown in FIG. 11, in some embodiments, the main portion 130m of the patterned electrode 130 may be an H shape, and the main portion 130m may be a continuous or discontinuous structure. For example, the main portion 130m may be divided into a left portion 130m-L and a right portion 130m-R, and/or a middle portion 130m-m. The middle portion 130m-m may be connected between the left portion 130m-L and the right portion 130m-R. In some embodiments, the branch portions 130t of the second sub-portion P2 and the third sub-portion P3 may be connected to the left portion 130m-L, and the branch portions 130t of the first sub-portion P1 and the fourth sub-portion P4 may be connected to the right portion 130m-R. In some embodiments, parts of the branch portions 130t of the first sub-portion P1, the second sub-portion P2, the third sub-portion P3, and/or the fourth sub-portion P4 may be connected to the middle portion 130m-m, but they are not limited thereto. In some embodiments (as shown in FIG. 11), the included angle between the extending direction of the branch portion 130t of any one of the first sub-portion P1, the second sub-portion P2, the third sub-portion P3 and the fourth sub-portion P4 and the extending direction of the middle portion 130m-m may be in a range from about 40 degrees to 50 degrees (40 degrees≤included angle≤50 degrees), but it is not limited thereto.

Figure 12:
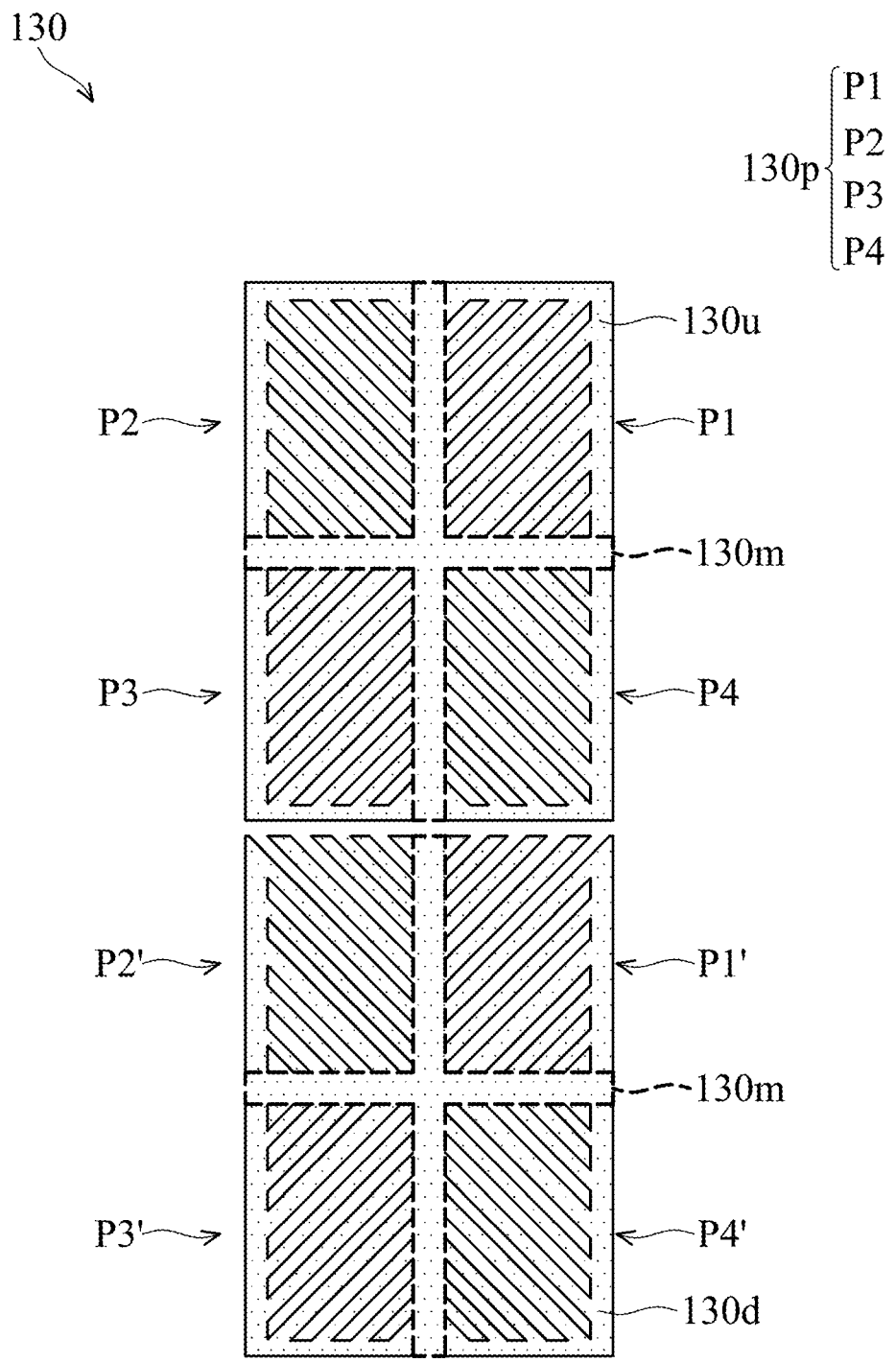
FIG. 12 is a top-view diagram of the patterned electrode of an electronic device in accordance with some embodiments of the present disclosure.

Furthermore, as shown in FIG. 12, in some embodiments, the patterned electrode 130 (corresponding to a sub-pixel) may be divided into an upper electrode 130u and a lower electrode 130d. The upper electrode 130u may be adjacent to the lower electrode 130d, but are not connected each other. In other words, the upper electrode 130u and the lower electrode 130d may be electrically insulated. In some embodiments, the upper electrode 130u and the lower electrode 130d may be operated separately. In some embodiments, the upper electrode 130u and the lower electrode 130d each have a main portion 130m. For example, the main portion 130m may divide the upper electrode 130u into four sub-portions, such as a first sub-portion P1, a second sub-portion P2, a third sub-portion P3 and a fourth sub-portion P4, but it is not limited thereto. Similarly, the main portion 130m may divide the lower electrode 130d into four sub-portions, such as a first sub-portion P1', a second sub-portion P2', a third sub-portion P3', and a fourth sub-portion P4', but it is not limited thereto. In some other embodiments, the patterned electrode 130 may have more or less number of main portions 130m or sub-portions according to needs. In some embodiments, the sizes of the upper electrode 130u and the lower electrode 130d may be the same or different. In some embodiments, the upper electrode 130u and the lower electrode 130d may include the aforementioned first peripheral portion 130S-1 and the second peripheral portion 130S-2.

Figure 13:
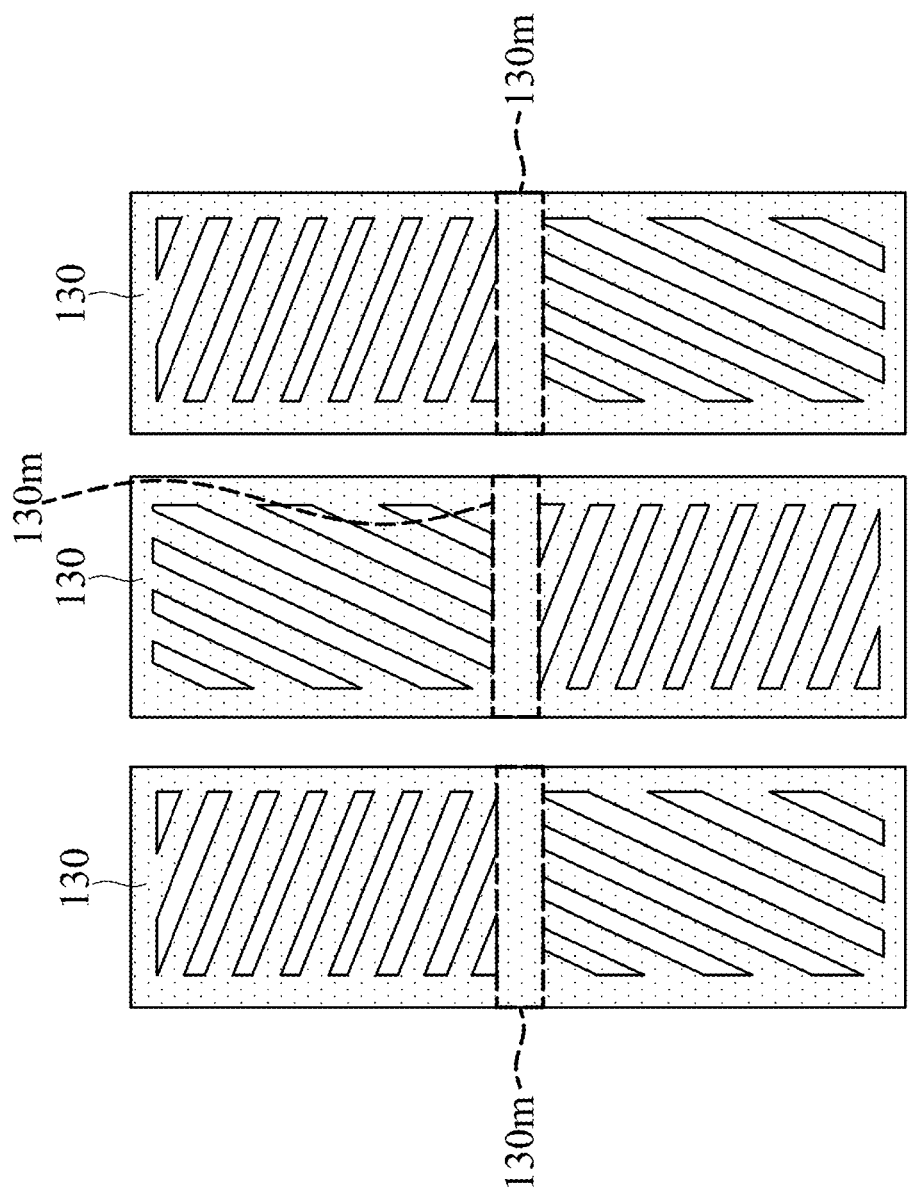
FIG. 13 is a top-view diagram of the patterned electrode of an electronic device in accordance with some embodiments of the present disclosure.

As shown in FIG. 13, in some embodiments, adjacent patterned electrodes 130 may be substantially symmetrical with each other (for example, mirror symmetry). In other words, the patterned electrodes 130 located in adjacent sub-pixels may be substantially symmetrical to each other. As shown in FIG. 13, in some embodiments, the patterned electrode 130 in the left sub-pixel and the patterned electrode 130 in the middle sub-pixel may substantially form a double cross shape, but it is not limited thereto. In some embodiments, the main portion 130m of the patterned electrode 130 may be a straight shape, and the main portion 130m may divide the patterned electrode 130 into two sub-portions (e.g., the upper sub-portion and lower sub-portion shown in FIG. 13). The included angle between the extending direction of the branch portions 130t in the upper sub-portion and the extending direction of the branch portions 130t in the lower sub-portion may be about 90 degrees, but it is not limited thereto.

To summarize the above, in accordance with some embodiments of the present disclosure, by adding the chiral dopant to the liquid-crystal layer and adjusting the included angle between the absorption axis of the polarizing plate and the patterned electrode, the light transmittance of the electronic device can be increased. In accordance with some embodiments of the present disclosure, the patterned electrode can be designed, for example, to have the first peripheral portion and/or the second peripheral portion, so that the problem of dark bands occurring in the edge area of the patterned electrode due to the ability to reduce the optical rotation of liquid crystals. The light transmittance of the electronic device therefore can be increased.

Although some embodiments of the present disclosure and their advantages have been described in detail, it should be understood that various changes, substitutions and alterations can be made herein without departing from the spirit and scope of the disclosure as defined by the appended claims. The features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods or steps. In addition, each claim constitutes an individual embodiment, and the claimed scope of the present disclosure includes the combinations of the claims and embodiments. The scope of protection of present disclosure is subject to the definition of the scope of the appended claims. Any embodiment or claim of the present disclosure does not need to meet all the purposes, advantages, and features disclosed in the present disclosure.

What is claimed is:

1. An electronic device, comprising:
a backlight source; and
a panel disposed on the backlight source, the panel comprising:
a first substrate adjacent to the backlight source;
a second substrate opposite to the first substrate;
a liquid-crystal layer disposed between the first substrate and the second substrate, the liquid-crystal layer comprising a left-handed chiral dopant;
a first polarizing plate having a first absorption axis;
a second polarizing plate having a second absorption axis, wherein the first absorption axis is perpendicular to the second absorption axis; and
a patterned electrode disposed between the first substrate and the liquid-crystal layer or between the second substrate and the liquid-crystal layer,
wherein the patterned electrode has at least one sub-portion, the at least one sub-portion comprises a plurality of branch portions, there is a first included angle between one of the plurality of branch portions and the first absorption axis, and there is a second included angle between one of the plurality of branch portions and the second absorption axis,
and while the patterned electrode is disposed between the first substrate and the liquid-crystal layer, the first included angle is greater than the second included angle, and while the patterned electrode is disposed between the second substrate and the liquid-crystal layer, the first included angle is smaller than the second included angle,
wherein the patterned electrode has a plurality of sub-portions, at least some of the plurality of sub-portions comprise a first peripheral portion or a second peripheral portion, the first peripheral portion and the second peripheral portion are connected to the plurality of branch portions,
wherein the first peripheral portion corresponds to an even-numbered edge and not an odd-numbered edge in the patterned electrode, a width of the first peripheral portion is in a range from 1 micrometer to 7 micrometers, and wherein the second peripheral portion corresponds to an odd-numbered edge and not an even-numbered edge in the patterned electrode, a width of the second peripheral portion is in a range from 1 micrometer to 7 micrometers.

2. The electronic device as claimed in claim 1, while at least some of the plurality of sub-portions comprise the first peripheral portion, the patterned electrode is disposed between the first substrate and the liquid-crystal layer.

3. The electronic device as claimed in claim 1, while at least some of the plurality of sub-portions comprise the first peripheral portion, one of the branch portions is bent or deformed in an area close to the first peripheral portion.

4. The electronic device as claimed in claim 1, while at least some of the plurality of sub-portions comprise the first peripheral portion, the patterned electrode comprises a main portion and a first sub-portion, a second sub-portion, a third sub-portion and a fourth sub-portion, and the first sub-portion, the second sub-portion, the third sub-portion, and the fourth sub-portion are arranged in a counterclockwise manner, and wherein the first sub-portion comprises a first edge and a second edge, the second sub-portion comprises a third edge and a fourth edge, the third sub-portion comprises a fifth edge and a sixth edge, and the fourth sub-portion comprises a seventh edge and an eighth edge, and wherein the first edge, the second edge, the third edge, the fourth edge, the fifth edge, the sixth edge, the seventh edge, and the eighth edge are arranged in a counterclockwise manner.

5. The electronic device as claimed claim 4, wherein the even-numbered edge comprises the second edge, the fourth edge, the sixth edge, or the eighth edge.

6. The electronic device as claimed in claim 1, while at least some of the plurality of sub-portions comprise the second peripheral portion, the patterned electrode is disposed between the second substrate and the liquid-crystal layer.

7. The electronic device as claimed in claim 1, while at least some of the plurality of sub-portions comprise the second peripheral portion, the patterned electrode comprises a main portion and a first sub-portion, a second sub-portion, a third sub-portion and a fourth sub-portion, and the first sub-portion, the second sub-portion, the third sub-portion, and the fourth sub-portion are arranged in a counterclockwise manner, and wherein the first sub-portion comprises a first edge and a second edge, the second sub-portion comprises a third edge and a fourth edge, the third sub-portion comprises a fifth edge and a sixth edge, and the fourth sub-portion comprises a seventh edge and an eighth edge, and wherein the first edge, the second edge, the third edge, the fourth edge, the fifth edge, the sixth edge, the seventh edge, and the eighth edge are arranged in a counterclockwise manner.

8. The electronic device as claimed in claim 7, wherein the odd-numbered edge comprises the first edge, the third edge, the fifth edge, or the seventh edge.

9. The electronic device as claimed in claim 1, while at least some of the plurality of sub-portions comprise the second peripheral portion, one of the branch portions is bent or deformed in an area close to the second peripheral portion.

10. The electronic device as claimed in claim 1, wherein the patterned electrode comprises a main portion, the plurality of branch portions are connected to the main portion and extend in a direction away from the main portion.

11. The electronic device as claimed in claim 4, wherein an extending direction of one of the plurality of branch portions in the first sub-portion is perpendicular to the first absorption axis.

12. The electronic device as claimed in claim 4, wherein an extending direction of one of the plurality of branch portions in the second sub-portion is perpendicular to the second absorption axis.

13. An electronic device, comprising:
a backlight source; and
a panel disposed on the backlight source, the panel comprising:
a first substrate adjacent to the backlight source;
a second substrate opposite to the first substrate;
a liquid-crystal layer disposed between the first substrate and the second substrate, the liquid-crystal layer comprising a right-handed chiral dopant;
a first polarizing plate having a first absorption axis;
a second polarizing plate having a second absorption axis, wherein the first absorption axis is perpendicular to the second absorption axis; and
a patterned electrode disposed between the first substrate and the liquid-crystal layer or between the second substrate and the liquid-crystal layer,
wherein the patterned electrode has at least one sub-portion, the at least one sub-portion comprises a plurality of branch portions, there is a first included angle between one of the plurality of branch portions and the first absorption axis, and there is a second included angle between one of the plurality of branch portions and the second absorption axis, and while the patterned electrode is disposed between the first substrate and the liquid-crystal layer, the first included angle is smaller than the second included angle, and while the patterned electrode is disposed between the second substrate and the liquid-crystal layer, the first included angle is greater than the second included angle, wherein the patterned electrode has a plurality of sub-portions, at least some of the plurality of sub-portions comprise a first peripheral portion or a second peripheral portion, the first peripheral portion and the second peripheral portion are connected to the plurality of branch portions, wherein the first peripheral portion corresponds to an even-numbered edge and not an odd-numbered edge in the patterned electrode, a width of the first peripheral portion is in a range from 1 micrometer to 7 micrometers, and wherein the second peripheral portion corresponds to an odd-numbered edge and not an even-numbered edge in the patterned electrode, a width of the second peripheral portion is in a range from 1 micrometer to 7 micrometers.

14. The electronic device as claimed in claim 13, while at least some of the plurality of sub-portions comprise the first peripheral portion, the patterned electrode is disposed between the second substrate and the liquid-crystal layer.

15. The display device as claimed in claim 13, while at least some of the plurality of sub-portions comprise the second peripheral portion, the patterned electrode is disposed between the first substrate and the liquid-crystal layer.

* * * * *